United States Patent
Hsieh

(10) Patent No.: US 11,036,032 B2
(45) Date of Patent: Jun. 15, 2021

(54) WIDE-ANGLE IMAGING LENS HAVING LENSES OF −++−+ REFRACTIVE POWERS

(71) Applicant: SENYUN PRECISION OPTICAL CORPORATION, Taoyuan (TW)

(72) Inventor: Tien-Liang Hsieh, Taoyuan (TW)

(73) Assignee: SENYUN PRECISION OPTICAL CORPORATION, Taoyuan (TW)

( * ) Notice: Subject to any disclaimer, the term of this patent is extended or adjusted under 35 U.S.C. 154(b) by 159 days.

(21) Appl. No.: 16/503,601

(22) Filed: Jul. 4, 2019

(65) Prior Publication Data

US 2020/0073090 A1    Mar. 5, 2020

(30) Foreign Application Priority Data

Aug. 31, 2018  (TW) ................................ 107130462

(51) Int. Cl.
| | |
|---|---|
| *G02B 13/00* | (2006.01) |
| *G02B 5/20* | (2006.01) |
| *G02B 13/18* | (2006.01) |
| *G02B 13/06* | (2006.01) |
| *G02B 9/60* | (2006.01) |

(52) U.S. Cl.
CPC ......... *G02B 13/0045* (2013.01); *G02B 5/208* (2013.01); *G02B 9/60* (2013.01); *G02B 13/06* (2013.01); *G02B 13/18* (2013.01)

(58) Field of Classification Search
CPC .... G02B 13/0045; G02B 5/208; G02B 13/18; G02B 13/06; G02B 9/60
See application file for complete search history.

(56) References Cited

U.S. PATENT DOCUMENTS

2004/0257671 A1* 12/2004 Kim ....................... G02B 13/18
                                                              359/680
2012/0069140 A1    3/2012 Tsai et al.

FOREIGN PATENT DOCUMENTS

| CN | 106597641 | 4/2017 |
|---|---|---|
| CN | 107102424 | 8/2017 |
| JP | 2006146016 | 6/2006 |

OTHER PUBLICATIONS

"Office Action of Korea Counterpart Application", dated Nov. 17, 2020, with English translation thereof, p. 1-p. 12.

* cited by examiner

*Primary Examiner* — Wen Huang
(74) *Attorney, Agent, or Firm* — JCIPRNET

(57) ABSTRACT

A wide-angle imaging lens including a first lens element, a second lens element, an aperture, a third lens element, a fourth lens element and a fifth lens element arranged in sequence from an object side to an image side along an optical axis is provided. The refractive powers of the first to the fifth lens elements are negative, positive, positive, and negative.

9 Claims, 8 Drawing Sheets

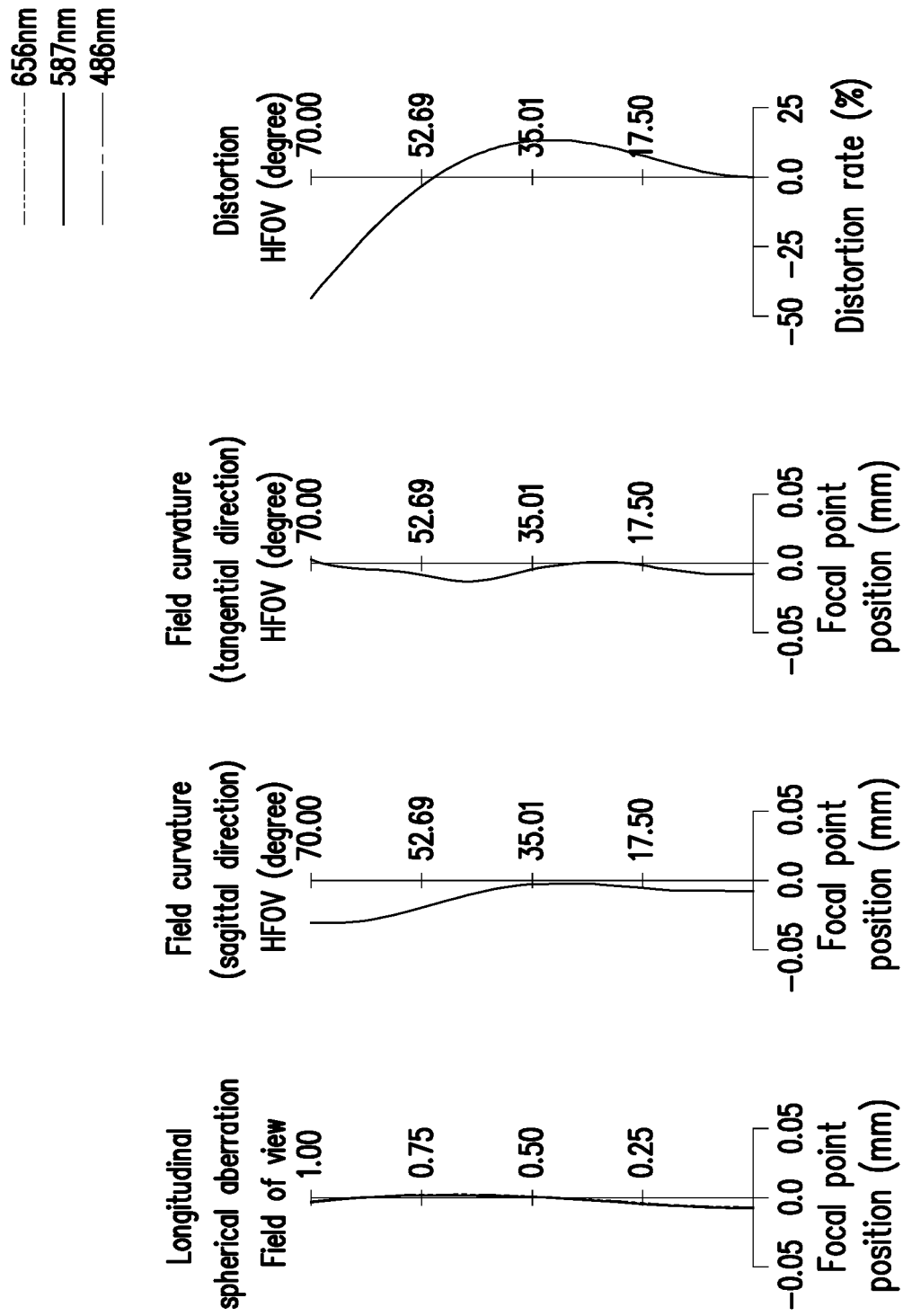

WIDE-ANGLE IMAGING LENS HAVING LENSES OF −++−+ REFRACTIVE POWERS

CROSS-REFERENCE TO RELATED APPLICATION

This application claims the priority benefit of Taiwan application serial no. 107130462, filed on Aug. 31, 2018. The entirety of the above-mentioned patent application is hereby incorporated by reference herein and made a part of this specification.

BACKGROUND OF THE INVENTION

1. Field of the Invention

The present invention relates to an optical imaging lens, and in particular, to a wide-angle imaging lens.

2. Description of Related Art

In recent years, popularization of mobile phones and digital cameras has brought explosion of photographic modules, and for the wide-angle imaging lenses that capture images and videos, it is hoped that the design will be lightweight and short. However, at this stage of the wide-angle imaging lens usually has a total track length (TTL), and thus is unfavourable for thinning of a lens. In view of the problem, how to design an imaging lens with high imaging quality, a relatively small TTL and a wide visual angle is always the direction of efforts of those skilled in the art.

SUMMARY OF THE INVENTION

The present invention provides a wide-angle imaging lens with a wide visual angle, a short lens length and a good optical quality.

An embodiment of the invention presents a wide-angle imaging lens including a first lens element, a second lens element, an aperture, a third lens element, a fourth lens element and a fifth lens arranged in a sequence from an object side to an image side along an optical axis is provided. Each of the first lens element to the fifth lens element includes an object-side surface acing the object side and allowing imaging rays to pass through and an image-side surface facing the image side and allowing imaging rays to pass through, and the lens elements with refractive power are only the five abovementioned lens elements. The first lens element has negative refractive power. An object-side surface of the first lens element includes a concave surface in the vicinity of the optical axis, and an image-side surface of the first lens element is a concave surface. The second lens element has positive refractive power. An object-side surface of the second lens element is a convex surface. The third lens element has positive refractive power. An object-side surface of the third lens element is a convex surface. An image-side surface of the third lens element is a convex surface. The fourth lens element has negative refractive power. An object-side surface of the fourth lens element is a concave surface. An image-side surface of the fourth lens element includes a concave portion in the vicinity of the optical axis. The fifth lens element has positive refractive power, and an image-side surface of the fifth lens element is a convex surface.

In an embodiment of the present invention, the wide-angle imaging lens described above satisfies: $-0.8 \leq EFL/R1 < 0$, where the EFL is an effective focal length of the wide-angle imaging lens, and the R1 is the radius of curvature on the object-side surface of the first lens element.

In an embodiment of the present invention, the wide-angle imaging lens described above satisfies: $0.8 \leq |EFL/f1| \leq 1.2$, where the EFL is an effective focal length of the wide-angle imaging lens, f1 is a focal length of the first lens element, and $|EFL/f1|$ is an absolute value of EFL/f1.

In an embodiment of the present invention, the wide-angle imaging lens described above satisfies: $-3.0 \leq (R3+R4)/(R3-R4) \leq 0.9$, where R3 is a curvature radius of the object-side surface of the second lens element, and R4 is a curvature radius of the image-side surface of the second lens element.

In an embodiment of the present invention, a field angle of the wide angle imaging lens ranges from 130 degrees to 150 degrees.

In an embodiment of the present invention, in a first lens element, a second lens element, a third lens element, a fourth lens element and a fifth lens element with refractive power, the refractive index of the second lens element is greater than the refractive index of the other lens elements with refractive power, and the Abbe number of the second lens element is less than the Abbe number equals to other lens elements with refractive power.

In an embodiment of the present invention, an object-side surface of the first lens element is a concave surface, and includes a concave portion in the vicinity of a periphery. An object-side surface of the second lens element is a convex surface. The image-side surface of the first lens element includes a convex portion located in the vicinity of the optical axis and a concave portion located in the vicinity of a periphery. An object-side surface of the fifth lens element includes a convex portion in the vicinity of the optical axis and a concave portion in the vicinity of a periphery.

In an embodiment of the present invention, an object-surface of the first lens element includes a convex portion in the vicinity of a periphery. An object-side surface of the second lens element is a convex surface. An image-side surface of the fourth lens element includes a concave portion in the vicinity of the optical axis and a convex portion in the vicinity of a periphery. An object-side surface of the fifth lens element includes a convex portion in the vicinity of the optical axis and a concave portion in the vicinity of a periphery.

In an embodiment of the present invention, an object-side surface of the first lens element is a concave surface, and includes a concave portion in the vicinity of a periphery. An object-side surface of the second lens element is a convex surface. An object-side surface of the fourth lens element is a concave surface, and includes a concave portion in the vicinity of a periphery. An image-side surface of the fifth lens element is a convex surface.

In an embodiment of the present invention, an object-side surface of the first lens element is a concave surface, and includes a concave portion in the vicinity of a periphery. An object-side surface of the second lens element is a concave surface. An image-side surface of the fourth lens element includes a concave portion in the vicinity of the optical axis and a convex portion in the vicinity of a periphery. An image-side surface of the fifth lens element is a concave surface.

Based on the above, the beneficial effect of the wide-angle imaging lens of the embodiments of the present invention is: by concave and convex shape design and arrangement of the object-side surfaces or image-side surfaces of the lens elements and combination of the refractive power of the lens elements, the wide-angle imaging lens can achieve a wide visual angle effect, a shorter lens length, and have good imaging quality.

In order to make the aforementioned features and advantages of the present invention comprehensible, embodiments accompanied with accompanying drawings are described in detail below.

BRIEF DESCRIPTION OF THE DRAWINGS

FIG. 8A to FIG. 8D are diagrams of a longitudinal spherical aberration and each aberration according to the fourth embodiment.

DESCRIPTION OF THE EMBODIMENTS

Figure 1:
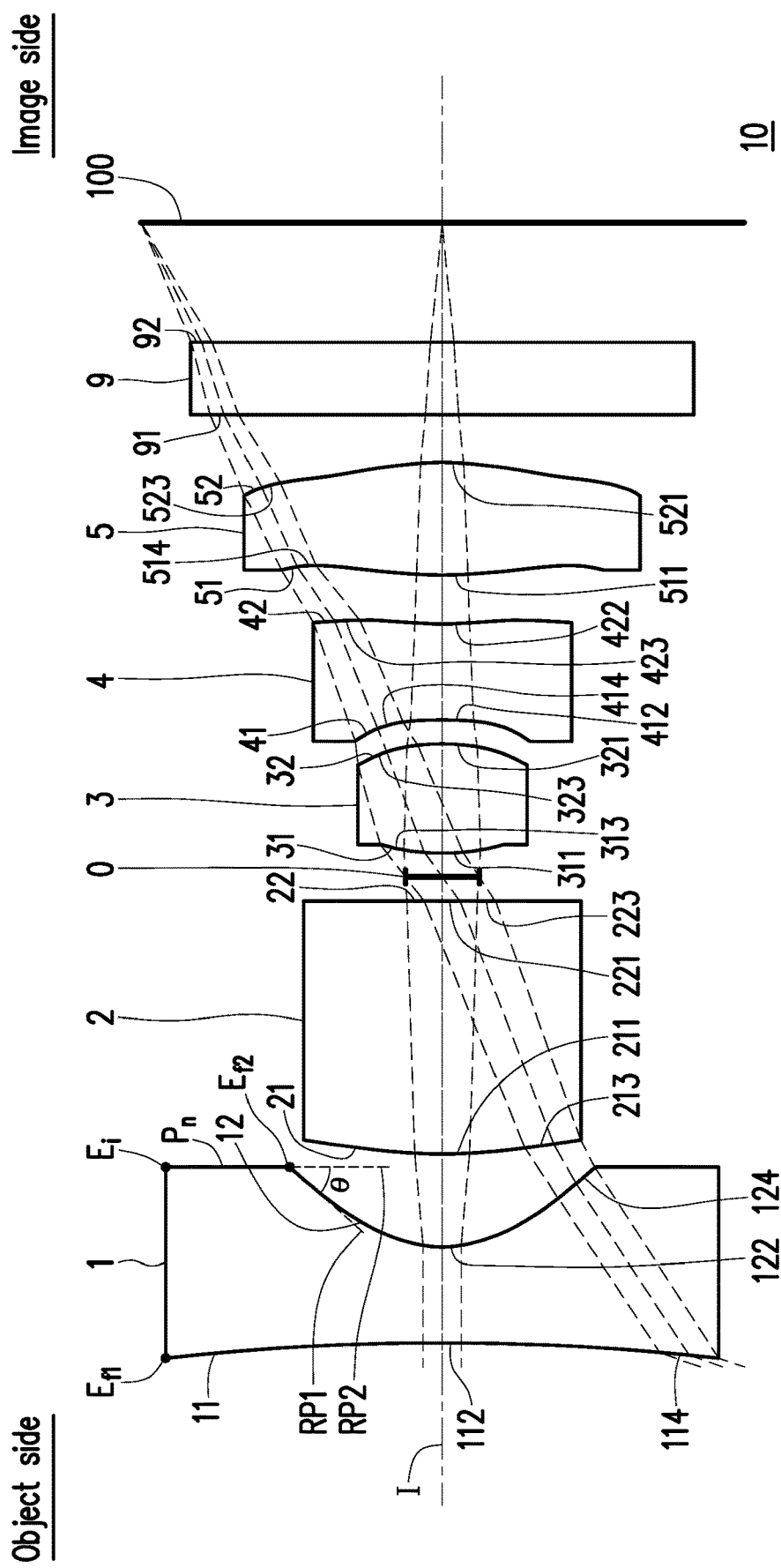
FIG. 1 is a schematic diagram of a wide-angle imaging lens according to a first embodiment of the present invention.

In the present specification, that a lens element has positive refractive power (or negative refractive power) refers to that the refractive power, calculated based on the theory of Gaussian optics, of the lens element on an optical axis is positive (or negative). In an imaging lens set, each lens element is radially symmetric with the optical axis as a symmetry axis. Each lens element includes an object-side surface and an image-side surface opposite to the object-side surface. The object-side surface and the image-side surface are defined as surfaces through which imaging rays pass. Herein, the imaging ray includes a chief ray and a marginal ray. The object-side surface (or the image-side surface) includes a portion in a vicinity of the optical axis and a portion in a vicinity of a periphery of the lens element surrounding and connecting the portion in a vicinity of the optical axis. The portion in a vicinity of the optical axis is a portion through which the imaging rays pass on the optical axis. The portion in a vicinity of a periphery is a portion which the marginal rays pass through.

That a surface (object-side surface or image-side surface) of the lens element is a convex surface or concave surface in the vicinity of the optical axis (or the portion in a vicinity of a periphery) may be determined by that an intersection of a ray (or a ray extending line) passing through the region in parallel and the optical axis is on an image side or an object side (ray focus determination method). For example, after the ray passes through the region and if the ray is focused towards the image side and the intersection with the optical axis may be on the image side, the region is a convex portion. On the contrary, after the ray passes through the region and if the ray diverged, the intersection of the extending line thereof and the optical axis is on the object side. A surface shape of the surface in the vicinity of the optical axis may be judged according to a judgment manner adopted by those skilled in the art, that is, the surface is judged to be concave or convex according to a positive or negative value of R (a paraxial curvature radius). For the object-side surface, when the value of R is positive, it is determined that the object-side surface is a convex surface in the vicinity of the optical axis, that is, the object-side surface includes a convex portion in the vicinity of the optical axis; and when the value of R is negative, it is determined that the object-side surface is a concave surface in the vicinity of the optical axis, that is, the object-side surface includes a concave portion in the vicinity of the optical axis. For the image-side surface, when the value of R is positive, it is determined that the image-side surface is a concave surface in the vicinity of the optical axis, that is, the image-side surface includes a concave portion in the vicinity of the optical axis; and when the value of R is negative, it is determined that the image-side surface is a convex surface in the vicinity of the optical axis, that is, the image-side surface includes a convex portion in the vicinity of the optical axis.

A surface (object-side surface or image-side surface) of the lens element may include one or more convex portions, one or more concave portions or a combination of the two. When the surface includes the convex portion and the concave portion, the surface includes an inflection point. The inflection point is a turning point between the convex portion and the concave portion. That is, the surface turns from convex to concave or turns from concave to convex at the inflection point. On the other aspect, when the surface only includes the convex portion or the concave portion, the surface includes no inflection point.

Referring to FIG. 1, a wide-angle imaging lens 10 according to a first embodiment of the present invention sequentially includes a first lens element 1, a second lens element 2, an aperture 0, a third lens element 3, a fourth lens element 4, a fifth lens element 5 and an optical filter 9 from an object side to an image side along an optical axis I. The object side is the side facing an object to be photographed, and the image side is the side facing an image plane 100. Rays emitted by the object to be photographed, after entering the wide-angle imaging lens 10, may sequentially pass through the first lens element 1, the second lens element 2, the aperture 0, the third lens element 3, the fourth lens element 4, the fifth lens element 5 and the optical filter 9 and then form an image on the image plane 100. The optical filter 9 is, for example, an infrared ray (IR) cut filter, and is configured to prevent affecting imaging quality caused by transmission of an infrared ray of partial wave band in the ray to the image plane 100. However, the present invention is not limited thereto.

The first lens element 1, the second lens element 2, the third lens element 3, the fourth lens element 4, the fifth lens element 5 and the optical filter 9 include object-side surfaces 11, 21, 31, 41, 51 and 91 facing the object side and allowing imaging rays to pass through and image-side surfaces 12, 22, 32, 42, 52 and 92 facing the image side and allowing imaging rays to pass through respectively.

The first lens element 1 has negative refractive power. The object-side surface 11 of the first lens element 1 is a concave surface, and includes a concave portion 112 located in the vicinity of the optical axis I and a concave portion 114 located in the vicinity of a periphery. The image-side surface 12 of the first lens element 1 is a concave surface, and includes a concave portion 122 located in the vicinity of the optical axis I and a concave portion 124 located in the vicinity of a periphery.

The second lens element 2 has positive refractive power. The object-side surface 21 of the second lens element 2 is a convex surface, and includes a convex portion 211 located in the vicinity of the optical axis I and a convex portion 213 located in the vicinity of a periphery. The image-side surface 22 of the second lens element 2 is a convex surface, and includes a convex portion 221 located in the vicinity of the optical axis I and a convex portion 223 located in the vicinity of a periphery.

An aperture 0 is arranged between the second lens element 2 and the third lens element 3.

The third lens element 3 has positive refractive power. The object-side surface 31 of the third lens element 3 is a convex surface, and includes a convex portion 311 located in the vicinity of the optical axis I and a convex portion 313 located in the vicinity of a periphery. The image-side surface 32 of the third lens element 3 is a convex surface, and includes a convex portion 321 located in the vicinity of the optical axis I and a convex portion 323 located in the vicinity of a periphery.

The fourth lens element 4 has negative refractive power. The object-side surface 41 of the fourth lens element 4 is a concave surface, and includes a concave portion 412 located in the vicinity of the optical axis and a concave portion 414 located in the vicinity of a periphery. The image-side surface 42 of the fourth lens element 4 includes a concave portion 422 located in the vicinity of the optical axis I and a convex portion 423 located in the vicinity of a periphery.

The fifth lens element 5 has positive refractive power. The object-side surface 51 of the fifth lens 5 includes a convex portion 511 in the vicinity of the optical axis I and a concave portion 514 in the vicinity of a periphery. The image-side surface 52 of the fifth lens element 5 is a convex surface and includes a convex portion 521 in the vicinity of the optical axis I and a convex portion 523 in the vicinity of a periphery.

In the wide-angle imaging lens 10 according to the present embodiment, the lens elements with refractive power are only the five abovementioned lens elements. Moreover, in the present embodiment, the first lens element 1 to the fifth lens element 5 may be made from, but not limited to, a plastic material, so as to meet a lightweight requirement. In another embodiment, the first lens element 1 to the fifth lens element 5 may be made from a glass material. In another example, at least one of the first lens element 1 to the fifth lens element 5 may be made from the glass material, while the other lens elements are made from the plastic material.

Other detailed optical data in the first embodiment is shown in Table 1. In table 1, A spacing (mm) corresponding to the object-side surface 11 of the first lens element 1 is 0.200 and represents that a distance (i.e., a thickness of the first lens element 1 on the optical axis I) between the object-side surface 11 of the first lens element 1 and the image-side surface 12 of the first lens element 1 on the optical axis I is 0.200 mm. A spacing (mm) corresponding to the image-side surface 12 of the first lens element 1 is 0.193 and represents that a distance between the image-side surface 12 of the first lens element 1 and the object-side surface 21 of the second lens element 2 is 0.193 mm. Other fields about the spacing (mm) may be reasoned in the same manner and will not be repeated below.

TABLE 1

First embodiment

| Name of the element | Surface | Curvature radius (mm) | Spacing (mm) | Refractive index | Abbe number | Focal length (mm) |
|---|---|---|---|---|---|---|
| Object | | Infinite | Infinite | | | |
| First lens element 1 | Object-side surface 11 | −5.413 | 0.200 | 1.545 | 55.9 | −0.4536 |
| | Image-side surface 12 | 0.263 | 0.193 | | | |
| Second lens element 2 | Object-side surface 21 | 1.044 | 0.525 | 1.651 | 21.5 | 1.486 |
| | Image-side surface 22 | −10.445 | 0.050 | | | |
| Aperture 0 | | Infinite | 0.050 | | | |
| Third lens element 3 | Object-side surface 31 | 0.487 | 0.226 | 1.545 | 55.9 | 0.4837 |
| | Image-side surface 32 | −0.481 | 0.05. | | | |
| Fourth lens element 4 | Object-side surface 41 | −1.026 | 0.200 | 1.651 | 21.5 | −0.6331 |
| | Image-side surface 42 | 0.742 | 0.102 | | | |
| Fifth lens element 5 | Object-side surface 51 | 1.03. | 0.233 | 1.545 | 55.9 | 0.7367 |
| | Image-side surface 52 | −0.606 | 0.100 | | | |
| Filter 9 | Object-side Surface 91 | Infinite | 0.150 | 1.516 | 64.1 | |
| | Image-side surface 92 | Infinite | 0.249 | | | |
| | Image plane 100 | Infinite | | | | |

In the present embodiment, the object-side surfaces 11, 21, 31, 41 and 51 and the image-side surfaces 12, 22, 32, 42 and 52, totally 10 surfaces, of the first lens element 1, the second lens element 2, the third lens element 3, the fourth lens element 4 and the fifth lens element 5 are all aspherical surfaces, and these aspherical surfaces are defined according to Formula (1):

$$Z(Y) = \frac{Y^2}{R} \bigg/ \left(1 + \sqrt{1 - (1+K)\frac{Y^2}{R^2}}\right) + \sum_{i=1}^{n} A_i \times Y^i \quad (1)$$

In Formula (1), Y is distance between a point on an aspherical curve and the optical axis I. Z is depth of the aspherical surface. R is curvature radius at a position, near the optical axis I, of the surface of the lens element. K is conic constant. $A_i$ is ith-order aspherical coefficient.

Each aspherical coefficient of the object-side surface 11 of the first lens element 1 to the image-side surface 52 of the fifth lens element 5 in Formula (1) is shown in Table 2. Field number 11 in Table 2 represents the aspherical coefficients of the object-side surface 11 of the first lens element 1, and the other fields may be reasoned in the same manner.

EFL/R1 is −0.08, where R1 is the curvature radius of the object-side surface 11 of the first lens element 1. |EFL/f1| is 0.88, where f1 is the focal length of the first lens element 1. (R3+R4)/(R3−R4) is −0.82, where R3 is the curvature radius of the object-side surface 21 of the second lens element 2, R4 is the curvature radius of the image-side surface 22 of the second lens element 2.

Figures 2A, 2B, 2C, 2D:
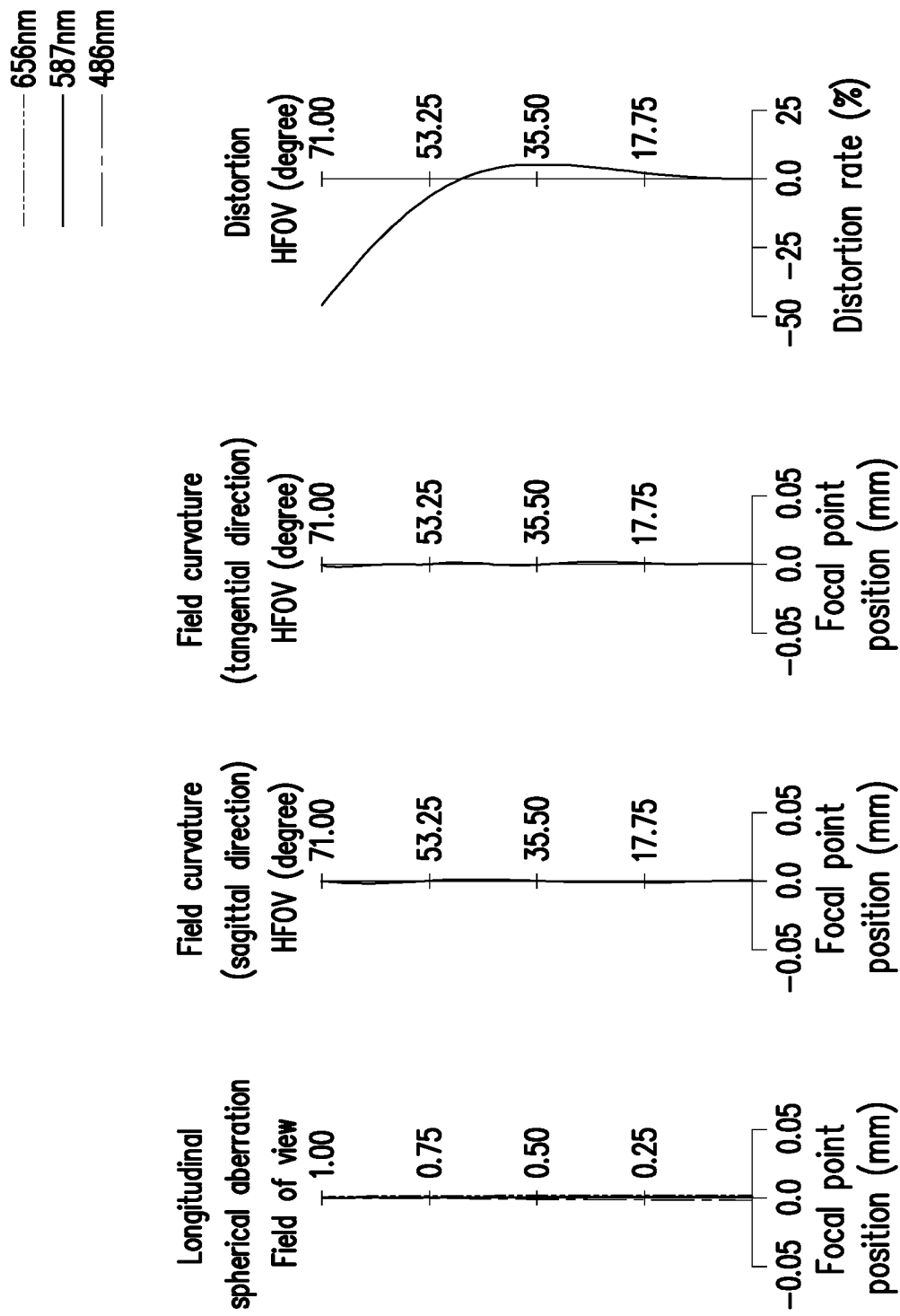
FIG. 2A to FIG. 2D are diagrams of a longitudinal spherical aberration and each aberration according to the first embodiment.

Referring to FIG. 2A to FIG. 2D, FIG. 2A graphically illustrates longitudinal spherical aberrations on the image plane 100 in case of wavelengths of 656 nanometers, 587 nanometers and 486 nanometers according to the first embodiment. FIG. 2B and FIG. 2C graphically illustrate a field curvature aberration in a sagittal direction and a field curvature aberration in a tangential direction on the image plane 100 in case of the wavelength of 587 nanometers according to the first embodiment respectively. FIG. 2D graphically illustrates a distortion aberration on the image plane 100 in case of the wavelength of 587 nanometers according to the first embodiment.

Referring to FIG. 2A again, curves of each wavelength are quite close to each other and get close to the middle, indicating that off-axis rays of each wavelength at different heights are focused nearby an imaging point. From deflection amplitudes of the curves of each wavelength, it can be

TABLE 2

| Surface | K | $A_4$ | $A_6$ | $A_8$ |
|---|---|---|---|---|
| 11 | −1.0368E+01 | 0.0000E+00 | 0.0000E+00 | 0.0000E+00 |
| 12 | −1.4762E+00 | 0.0000E+00 | 0.0000E+00 | 0.0000E+00 |
| 21 | −1.2380E+00 | −1.9191E+00 | 3.9464E+00 | 0.0000E+00 |
| 22 | −9.7840E+01 | 2.6251E+00 | −2.9890E+01 | 3.6413E+03 |
| 31 | 1.1854E+00 | 9.2423E−01 | −1.1588E+02 | 7.1875E+03 |
| 32 | 3.3551E+00 | −1.5233E+01 | 4.5599E+02 | −6.7467E+03 |
| 41 | −3.9546E+00 | −3.8215E+01 | 5.0400E+02 | −4.1404E+03 |
| 42 | −3.2674E+01 | −1.2981E+01 | 1.3391E+02 | −3.2228E+01 |
| 51 | 6.6145E+00 | −3.5008E+00 | −1.7801E+01 | −2.2627E+01 |
| 52 | −1.5460E+00 | 5.9154E+00 | 1.5793E+01 | −7.1609E+02 |

| Surface | $A_{10}$ | $A_{12}$ | $A_{14}$ | $A_{16}$ |
|---|---|---|---|---|
| 11 | 0.0000E+00 | 0.0000E+00 | 0.0000E+00 | 0.0000E+00 |
| 12 | 0.0000E+00 | 0.0000E+00 | 0.0000E+00 | 0.0000E+00 |
| 21 | 0.0000E+00 | 0.0000E+00 | 0.0000E+00 | 0.0000E+00 |
| 22 | −6.3245E+04 | 0.0000E+00 | 0.0000E+00 | 0.0000E+00 |
| 31 | −2.4305E+05 | 2.7701E+06 | 0.0000E+00 | 0.0000E+00 |
| 32 | 6.2146E+04 | 1.9606E+05 | 0.0000E+00 | 0.0000E+00 |
| 41 | −5.7346E+04 | 6.8114E+05 | 0.0000E+00 | 0.0000E+00 |
| 42 | −8.5608E+03 | 5.5614E+04 | 0.0000E+00 | 0.0000E+00 |
| 51 | 3.0995E+03 | −3.2514E+04 | 7.5712E+04 | 0.0000E+00 |
| 52 | 5.4886E+03 | −2.0078E+04 | 2.8502E+04 | 0.0000E+00 |

A relationship among important parameters in the wide-angle imaging lens 10 according to the first embodiment is shown in Table 3.

TABLE 3

| EFL | 0.40 mm |
|---|---|
| Half Angle of View (HFOV) | 71.0 degrees |
| TTL | 2.328 mm |
| f-number | 5.00 |
| EFL/R1 | −0.08 |
| |EFL/f1| | 0.88 |
| (R3 + R4)/(R3 − R4) | −0.82 |

The EFL of the wide-angle imaging lens 10 according to the first embodiment is 0.40 mm. The HFOV is 71.0 degrees. The TTL is a distance between the object-side surface 11 of the first lens element 1 and the image plane 100 on the optical axis I, and is 2.328 mm. The f-number is 5.00.

seen that imaging point deviations of the off-axis rays at different heights are controlled to be within a range of ±0.01 mm. Therefore, the spherical aberration of the same wavelength is actually obviously improved in the first embodiment. In addition, distances among the three representative wavelengths are also quite close, indicating that imaging positions of the rays of different wavelengths have been quite concentrated, so that chromatic aberrations are also obviously improved.

In the two field curvature aberration diagrams of FIG. 2B and FIG. 2C, a focal length variation of the representative wavelength 587 nanometers in the whole field of view falls within the range of ±0.01 mm, indicating that aberrations may be effectively eliminated in the first embodiment. The distortion aberration diagram of FIG. 2D shows that the distortion aberration in the first embodiment is kept within a range of ±50%, indicating that the distortion aberration in the first embodiment has met a requirement on imaging quality of an optical system. Thus, it can be seen that high imaging quality may still be achieved in the first embodiment, compared with an existing optical lens, even under the condition that the TTL of the lens has been reduced to approximately 2.328 mm.

Figure 3:
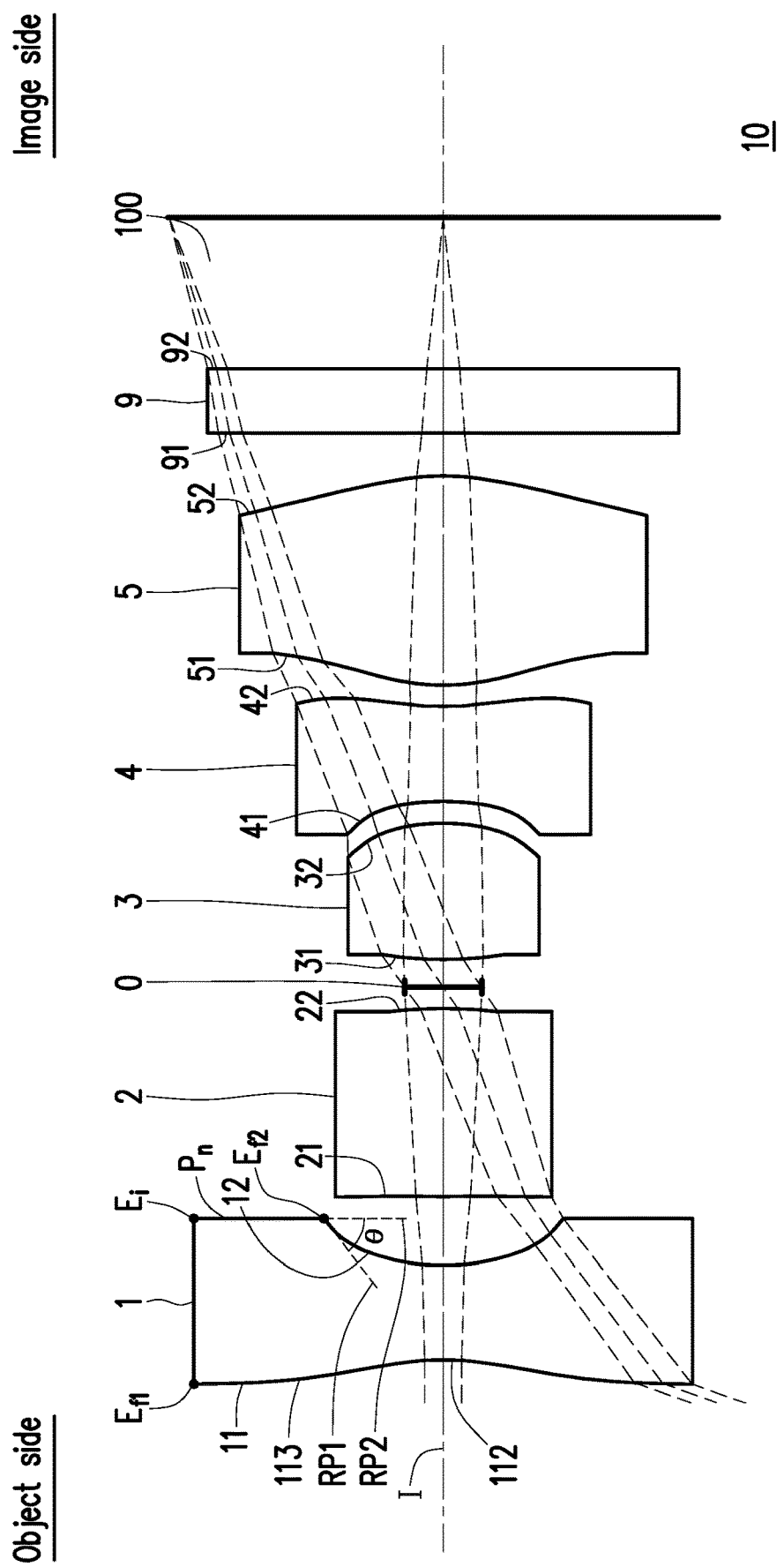
FIG. 3 is a schematic diagram of a wide-angle imaging lens according to a second embodiment of the present invention.

FIG. 3 is a schematic diagram of a wide-angle imaging lens according to a second embodiment of the present invention. FIG. 4A to FIG. 4D are diagrams of a longitudinal spherical aberration and each aberration according to the second embodiment. Referring to FIG. 3 at first, the second embodiment of the wide-angle imaging lens 10 of the present invention is substantially similar to the first embodiment, and the difference therebetween is as follows: each optical data, aspherical coefficient and parameter between these lens elements 1, 2, 3, 4 and 5 are more or less different. In addition, the object-side surface 11 of the first lens element 1 includes a concave portion 112 in the vicinity of the optical axis I and a convex portion 113 in the vicinity of a periphery. It should be noted that, for clearly presenting the diagram, it should be mentioned that the same reference numbers of the concave portions and the convex portions in the two embodiments are omitted in FIG. 3.

The other detailed optical data in the second embodiment is shown in Table 4. Each aspherical coefficient of the object-side surface 11 of the first lens element 1 to the image-side surface 52 of the fifth lens element 5 in the second embodiment in Formula (1) is shown in Table 5.

TABLE 4

Second embodiment

| Name of the element | Surface | Curvature radius (mm) | Spacing (mm) | Refractive index | Abbe number | Focal length (mm) |
|---|---|---|---|---|---|---|
| Object | | Infinite | Infinite | | | |
| First lens element 1 | Object-side surface 11 | −0.533 | 0.220 | 1.545 | 55.9 | −0.4696 |
| | Image-side surface 12 | 0.564 | 0.159 | | | |
| Second lens element 2 | Object-side surface 21 | 9.809 | 0.435 | 1.651 | 21.5 | 1.8147 |
| | Image-side surface 22 | −1.319 | 0.050 | | | |
| Aperture 0 | | Infinite | 0.065 | | | |
| Third lens element 3 | Object-side surface 31 | 0.715 | 0.317 | 1.545 | 55.9 | 0.5899 |
| | Image-side surface 32 | −0.478 | 0.050 | | | |
| Fourth lens element 4 | Object-side surface 41 | −0.672 | 0.220 | 1.651 | 21.5 | −0.4592 |
| | Image-side surface 42 | 0.608 | 0.050 | | | |
| Fifth lens element 5 | Object-side surface 51 | 0.492 | 0.485 | 1.545 | 55.9 | 0.5587 |
| | Image-side surface 52 | −0.522 | 0.100 | | | |
| Filter 9 | Object-side Surface 91 | Infinite | 0.150 | 1.516 | 64.1 | |
| | Image-side surface 92 | Infinite | 0.350 | | | |
| Image plane 100 | | Infinite | | | | |

TABLE 5

| Surface | K | $A_4$ | $A_6$ | $A_8$ |
|---|---|---|---|---|
| 11 | −1.6947E+01 | 1.2823E+00 | −3.3119E+00 | 3.1385E+00 |
| 12 | 2.4432E+00 | 4.8012E−01 | 2.9574E+01 | 0.0000E+00 |
| 21 | 5.6530E+01 | −4.3623E+00 | 8.1300E+01 | −4.9949E+02 |
| 22 | −2.3080E+01 | −3.7925E+00 | 9.0788E+01 | −6.2050E+03 |
| 31 | 4.1783E+00 | −3.7100E+00 | −2.1961E+02 | 7.2770E+03 |
| 32 | −3.6667E+00 | −3.0030E+00 | −6.1651E+02 | 8.6998E+03 |
| 41 | 6.3321E+00 | −1.1510E+00 | −3.7726E+02 | 4.7780E+02 |
| 42 | −3.0926E+01 | 2.1012E+00 | −1.9495E+02 | 2.9850E+03 |
| 51 | 8.8206E−02 | −5.6890E+00 | 2.1178E+00 | −2.1988E+02 |
| 52 | −1.1123E+01 | −6.7840E−01 | 4.7378E+01 | −6.7124E+02 |

| Surface | $A_{10}$ | $A_{12}$ | $A_{14}$ | $A_{16}$ |
|---|---|---|---|---|
| 11 | 0.0000E+00 | 0.0000E+00 | 0.0000E+00 | 0.0000E+00 |
| 12 | 0.0000E+00 | 0.0000E+00 | 0.0000E+00 | 0.0000E+00 |
| 21 | 0.0000E+00 | 0.0000E+00 | 0.0000E+00 | 0.0000E+00 |
| 22 | 1.3689E+05 | 0.0000E+00 | 0.0000E+00 | 0.0000E+00 |
| 31 | −1.7019E+05 | 2.7701E+06 | 0.0000E+00 | 0.0000E+00 |
| 32 | −4.0065E+04 | 1.9606E+05 | 0.0000E+00 | 0.0000E+00 |

TABLE 5-continued

| 41 | 2.4774E+04 | 6.8114E+05 | 0.0000E+00 | 0.0000E+00 |
| 42 | −2.0934E+04 | 5.5614E+04 | 0.0000E+00 | 0.0000E+00 |
| 51 | 4.8334E+03 | −3.3808E+04 | 7.5794E+04 | 0.0000E+00 |
| 52 | 4.3153E+03 | −1.3462E+04 | 1.6636E+04 | 0.0000E+00 |

A relationship among important parameters in the wide-angle imaging lens 10 according to the second embodiment is shown in Table 6.

TABLE 6

| EFL | 0.38 mm |
| Half Angle of View (HFOV) | 70.0 degrees |
| TTL | 2.650 mm |
| f-number | 4.50 |
| EFL/R1 | −0.71 |
| |EFL/f1| | 0.81 |
| (R3 + R4)/(R3 − R4) | 0.76 |

Figure 4:
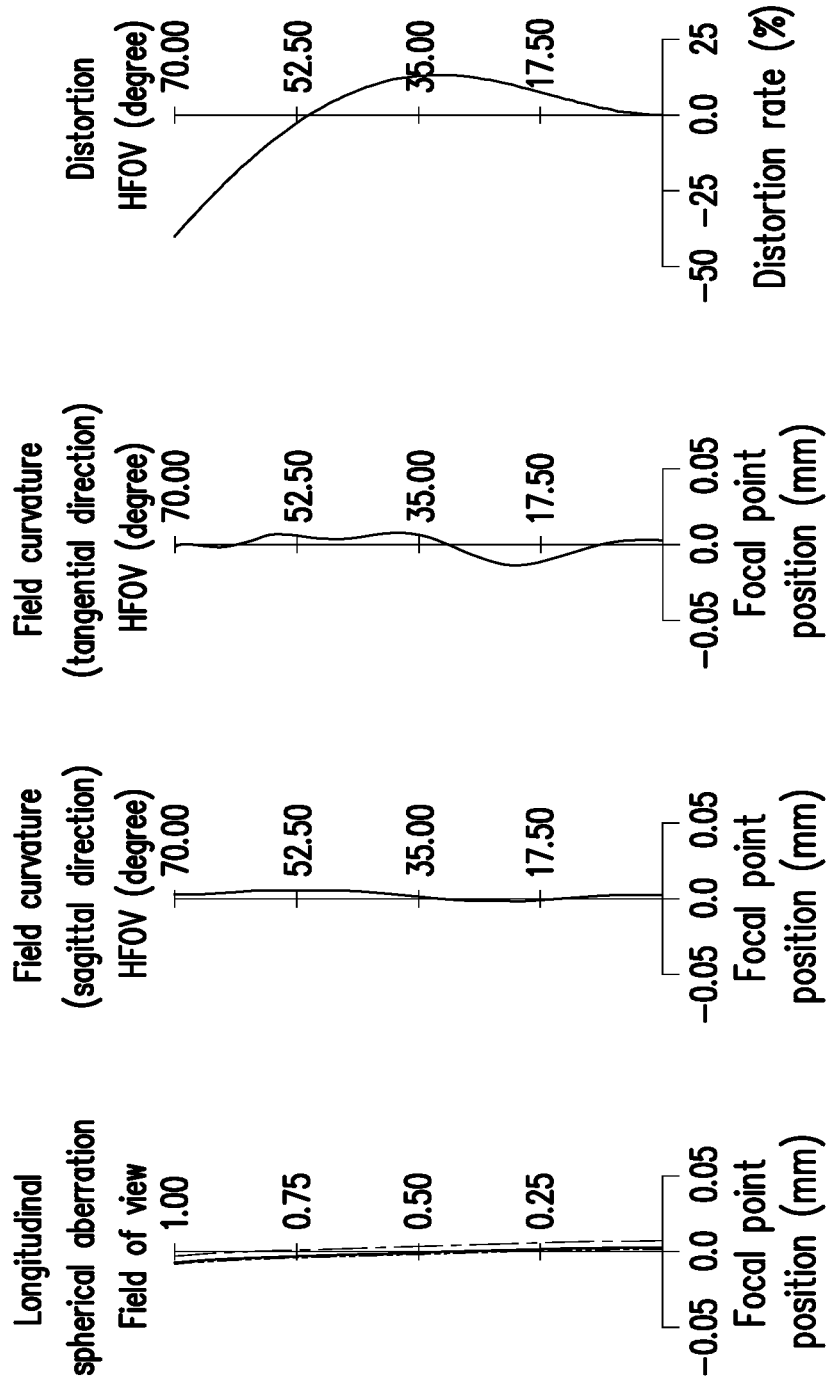
FIG. 4A to FIG. 4D are diagrams of a longitudinal spherical aberration and each aberration according to the second embodiment.

In the longitudinal spherical aberration diagram 4A of the second embodiment, imaging point deviations of off-axis rays at different heights are controlled to be within a range of ±0.025 mm. In the two field curvature aberration diagrams of FIG. 4B and FIG. 4C, focal length variations of three representative wavelengths in the whole field of view falls within a range of ±0.025 mm. The distortion aberration diagram of FIG. 4D shows that the distortion aberration in the second embodiment is kept within a range of ±40%. Thus, it can be seen that the wide-angle imaging lens 10 according to the second embodiment may be endowed with high optical imaging quality under the condition that the TTL has been reduced to approximately 2.650 mm.

Figure 5:
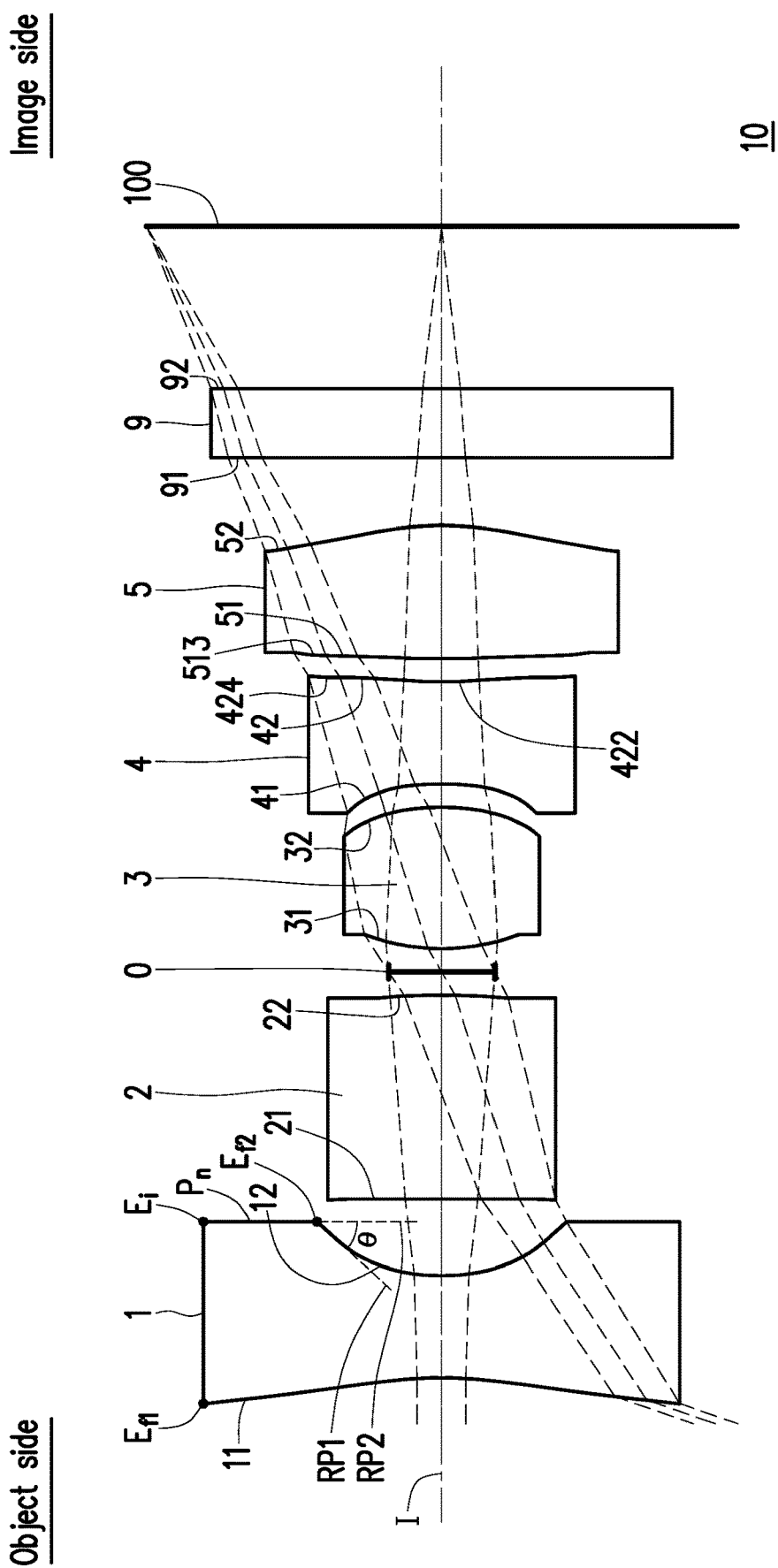
FIG. 5 is a schematic diagram of a wide-angle imaging lens according to a third embodiment of the present invention.

FIG. 5 is a schematic diagram of a wide-angle imaging lens according to a third embodiment of the present invention. FIG. 6A to FIG. 6D are diagrams of a longitudinal spherical aberration and each aberration according to the third embodiment. Referring to FIG. 5 at first, the third embodiment of the wide-angle imaging lens 10 of the present invention is substantially similar to the first embodiment, and the difference therebetween is as follows: each optical data, aspherical coefficient and parameter between these lens elements 1, 2, 3, 4 and 5 are more or less different. In addition, the image-side surface 42 of the fourth lens element 4 is a concave surface, and includes a concave portion 422 located in the vicinity of the optical axis I and a concave portion 424 located in the vicinity of a periphery. The object-side surface 51 of the fifth lens element 5 is a convex surface, and includes a convex portion 511 located in the vicinity of the optical axis I and a convex portion 513 located in the vicinity of a periphery. It should be noted that, for clearly presenting the diagram, it should be mentioned that the same reference numbers of the concave portions and the convex portions in the two embodiments are omitted in FIG. 5.

The other detailed optical data in the second embodiment is shown in Table 7. Each aspherical coefficient of the object-side surface 11 of the first lens element 1 to the image-side surface 52 of the fifth lens element 5 in the third embodiment in Formula (1) is shown in Table 8.

TABLE 7

Third embodiment

| Name of the element | Surface | Curvature radius (mm) | Spacing (mm) | Refractive index | Abbe number | Focal length (mm) |
| --- | --- | --- | --- | --- | --- | --- |
| Object | | Infinite | Infinite | | | |
| First lens element 1 | Object-side surface 11 | −0.699 | 0.220 | 1.545 | 55.9 | −0.4759 |
| | Image-side surface 12 | 0.458 | 0.165 | | | |
| Second lens element 2 | Object-side surface 21 | 33.158 | 0.440 | 1.651 | 21.5 | 2.5159 |
| | Image-side surface 22 | −1.714 | 0.050 | | | |
| Aperture 0 | | Infinite | 0.050 | | | |
| Third lens element 3 | Object-side surface 31 | 0.435 | 0.306 | 1.545 | 55.9 | 0.4985 |
| | Image-side surface 32 | −0.544 | 0.050 | | | |
| Fourth lens element 4 | Object-side surface 41 | −0.852 | 0.220 | 1.651 | 21.5 | −0.6371 |
| | Image-side surface 42 | 0.890 | 0.050 | | | |
| Fifth lens element 5 | Object-side surface 51 | 4.720 | 0.287 | 1.545 | 55.9 | 1.0087 |
| | Image-side surface 52 | −0.609 | 0.146 | | | |
| Filter 9 | Object-side surface 91 | Infinite | 0.150 | 1.516 | 64.1 | |
| | Image-side surface 92 | Infinite | 0.350 | | | |
| Image plane 100 | | Infinite | | | | |

TABLE 8

| Surface | K | $A_4$ | $A_6$ | $A_8$ |
|---|---|---|---|---|
| 11 | −2.4926E+01 | 1.0600E+00 | −3.9206E+00 | 4.2914E+00 |
| 12 | −7.0793E+00 | 1.7890E+01 | −2.1040E+02 | 4.4030E+03 |
| 21 | −2.4769E+01 | −2.1266E+00 | 9.4321E+01 | −2.0433E+03 |
| 22 | −9.9000E+01 | −3.2360E+00 | −4.8262E+01 | 7.2036E+03 |
| 31 | 1.8031E+00 | −4.5529E+00 | −4.0490E+00 | −3.4634E+03 |
| 32 | −2.3016E+01 | −3.5130E+01 | 1.0050E+03 | −2.7008E+04 |
| 41 | 3.0715E+00 | −3.2676E+01 | 6.4060E+02 | −1.1517E+04 |
| 42 | −5.3079E+01 | −4.7811E+00 | −9.0150E+00 | 1.2669E+03 |
| 51 | 3.1449E+01 | 4.8277E+00 | −1.8937E+02 | 2.7085E+03 |
| 52 | −8.8901E+00 | 2.1751E+00 | 1.2258E−01 | −3.3814E+02 |

| Surface | $A_{10}$ | $A_{12}$ | $A_{14}$ | $A_{16}$ |
|---|---|---|---|---|
| 11 | 0.0000E+00 | 0.0000E+00 | 0.0000E+00 | 0.0000E+00 |
| 12 | −3.6871E+04 | 0.0000E+00 | 0.0000E+00 | 0.0000E+00 |
| 21 | 2.1433E+04 | −1.3799E+05 | 0.0000E+00 | 0.0000E+00 |
| 22 | −2.9754E+05 | 4.7360E+06 | 0.0000E+00 | 0.0000E+00 |
| 31 | 1.2342E+05 | −2.6092E+06 | 0.0000E+00 | 0.0000E+00 |
| 32 | 3.8948E+05 | −2.5128E+06 | 0.0000E+00 | 0.0000E+00 |
| 41 | 1.9665E+04 | 7.4688E+05 | 0.0000E+00 | 0.0000E+00 |
| 42 | −1.3838E+04 | 5.7943E+04 | 0.0000E+00 | 0.0000E+00 |
| 51 | −1.7758E+04 | 5.5526E+04 | −5.5948E+04 | 0.0000E+00 |
| 52 | 3.9629E+03 | −1.8524E+04 | 3.3060E+04 | 0.0000E+00 |

A relationship among important parameters in the wide-angle imaging lens 10 according to the third embodiment is shown in Table 9.

TABLE 9

| EFL | 0.47 mm |
|---|---|
| Half Angle of View (HFOV) | 70.0 degrees |
| TTL | 2.483 mm |
| f-number | 4.40 |
| EFL/R1 | −0.67 |
| |EFL/f1| | 0.99 |
| (R3 + R4)/(R3 − R4) | 0.90 |

Figure 6:
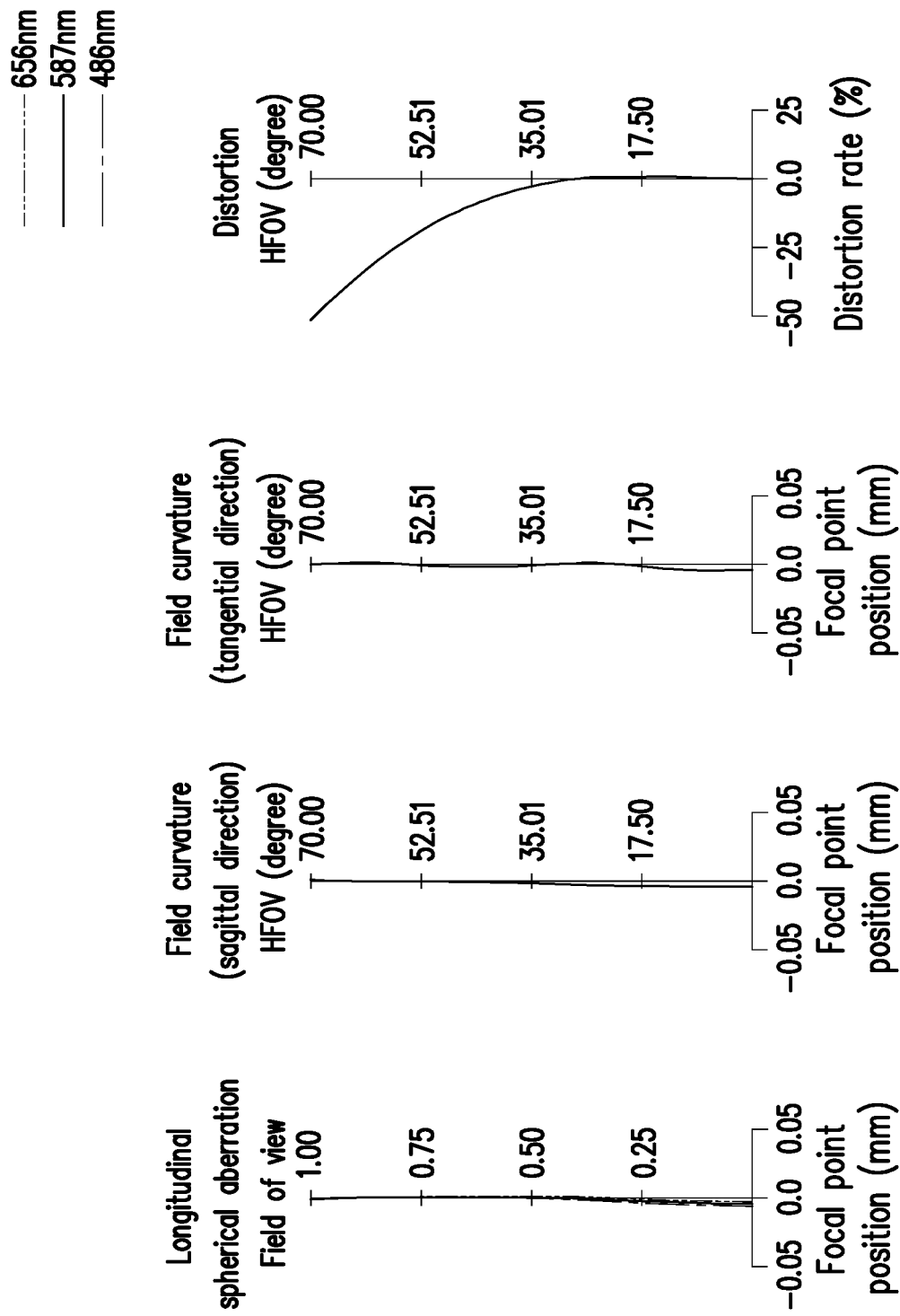
FIG. 6A to FIG. 6D are diagrams of a longitudinal spherical aberration and each aberration according to the third embodiment.

In the longitudinal spherical aberration diagram of the third embodiment shown in FIG. 6A, imaging point deviations of off-axis rays at different heights are controlled to be within a range of ±0.01 mm. In the two field curvature aberration diagrams of FIG. 6B and FIG. 6C, focal length variations of three representative wavelengths in the whole field of view falls within a range of ±0.01 mm. The distortion aberration diagram of FIG. 6D shows that the distortion aberration in the second embodiment is kept within a range of ±50%. Thus, it can be seen that the wide-angle imaging lens 10 according to the third embodiment may be endowed with high optical imaging quality under the condition that the TTL has been reduced to approximately 2.483 mm.

Figure 7:
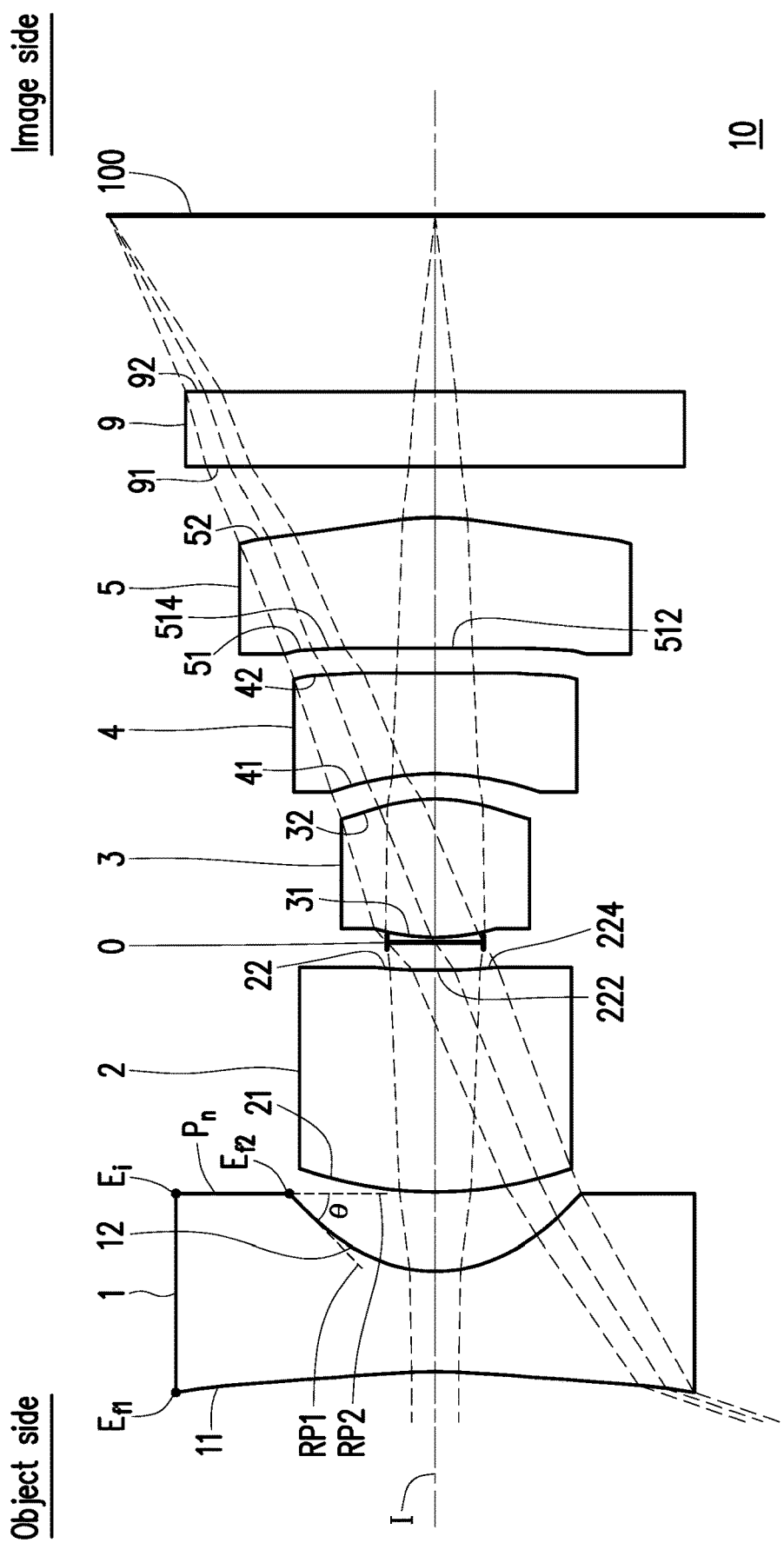
FIG. 7 is a schematic diagram of a wide-angle imaging lens according to a fourth embodiment of the present invention.

FIG. 7 is a schematic diagram of a wide-angle imaging lens according to a fourth embodiment of the present invention. FIG. 8A to FIG. 8D are diagrams of a longitudinal spherical aberration and each aberration according to the fourth embodiment. Referring to FIG. 7 at first, the fourth embodiment of the wide-angle imaging lens 10 of the present invention is substantially similar to the first embodiment, and the difference therebetween is as follows: each optical data, aspherical coefficient and parameter between these lens elements 1, 2, 3, 4 and 5 are more or less different. In addition, the image-side surface 22 of the second lens element 2 is a concave surface, and includes a concave portion 222 located in the vicinity of the optical axis I and a concave portion 224 located in the vicinity of a periphery. The object-side surface 51 of the fifth lens element 5 is a concave surface, and includes a concave portion 512 located in the vicinity of the optical axis I and a concave portion 514 located in the vicinity of a periphery. It should be noted that, for clearly presenting the diagram, it should be mentioned that the same reference numbers of the concave portions and the convex portions in the two embodiments are omitted in FIG. 7.

The other detailed optical data in the fourth embodiment is shown in Table 10. Each aspherical coefficient of the object-side surface 11 of the first lens element 1 to the image-side surface 52 of the fifth lens element 5 in the fourth embodiment in Formula (1) is shown in Table 11.

TABLE 10

| | | Fourth embodiment | | | | |
|---|---|---|---|---|---|---|
| Name of the element | Surface | Curvature radius (mm) | Spacing (mm) | Refractive index | Abbe number | Focal length (mm) |
| Object | | Infinite | Infinite | | | |
| First lens element 1 | Object-side surface 11 | −0.996 | 0.200 | 1.545 | 55.9 | −0.3645 |
| | Image-side surface 12 | 0.266 | 0.157 | | | |
| Second lens element 2 | Object-side surface 21 | 0.663 | 0.440 | 1.651 | 21.5 | 1.5973 |
| | Image-side surface 22 | 1.353 | 0.056 | | | |

TABLE 10-continued

Fourth embodiment

| Name of the element | Surface | Curvature radius (mm) | Spacing (mm) | Refractive index | Abbe number | Focal length (mm) |
|---|---|---|---|---|---|---|
| Aperture 0 | | Infinite | 0.010 | | | |
| The third lens element 3 | Object-side surface 31 | 0.423 | 0.275 | 1.545 | 55.9 | 0.3901 |
| | Image-side surface 32 | −0.329 | 0.050 | | | |
| Fourth lens element 4 | Object-side surface 41 | −0.547 | 0.200 | 1.651 | 21.5 | −0.7905 |
| | Image-side surface 42 | 9.795 | 0.050 | | | |
| Fifth lens element 5 | Object-side surface 51 | −3.708 | 0.258 | 1.545 | 55.9 | 1.1674 |
| | Image-side surface 52 | −0.556 | 0.102 | | | |
| Filter 9 | Object-side surface 91 | Infinite | 0.150 | 1.56 | 64.1 | |
| | Image-side surface 92 | Infinite | 0.350 | | | |
| | Image plane 100 | Infinite | | | | |

TABLE 11

| Surface | K | $A_4$ | $A_6$ | $A_8$ |
|---|---|---|---|---|
| 11 | −9.9000E+01 | 4.3004E−01 | −2.0093E+00 | 1.1862E+00 |
| 12 | −1.1672E+00 | −2.5559E+00 | 9.7652E+01 | 8.9671E+01 |
| 21 | −3.2680E+01 | 4.6320E+00 | −1.5628E+01 | −2.0898E+02 |
| 22 | 4.0674E+01 | 3.2007E−01 | −1.6251E+02 | 3.5683E+04 |
| 31 | 3.2996E+00 | −5.0175E+00 | 8.1882E+01 | −7.7727E+03 |
| 32 | −9.7119E+00 | −2.1234E+01 | 8.4775E+02 | −2.2295E+04 |
| 41 | −1.6901E+01 | −1.2895E+01 | 5.1420E+02 | −1.9108E+04 |
| 42 | −9.9000E+01 | −2.8205E+00 | −9.9542E+01 | 4.4210E+03 |
| 51 | 8.5999E+01 | 1.3451E+01 | −6.3835E+02 | 1.4257E+04 |
| 52 | 7.7560E−01 | 1.5730E+01 | −1.8597E+02 | 1.2508E+03 |

| Surface | $A_{10}$ | $A_{12}$ | $A_{14}$ | $A_{16}$ |
|---|---|---|---|---|
| 11 | 0.0000E+00 | 0.0000E+00 | 0.0000E+00 | 0.0000E+00 |
| 12 | −8.3965E+03 | 0.0000E+00 | 0.0000E+00 | 0.0000E+00 |
| 21 | 5.7819E+03 | −5.3084E+04 | 0.0000E+00 | 0.0000E+00 |
| 22 | −2.5561E+06 | 7.0932E+07 | 0.0000E+00 | 0.0000E+00 |
| 31 | 2.8162E+05 | 0.0000E+00 | 0.0000E+00 | 0.0000E+00 |
| 32 | 3.6267E+05 | 0.0000E+00 | 0.0000E+00 | 0.0000E+00 |
| 41 | 3.3218E+05 | −1.5510E+06 | 0.0000E+00 | 0.0000E+00 |
| 42 | −6.1367E+04 | 2.6939E+05 | 0.0000E+00 | 0.0000E+00 |
| 51 | −1.6621E+05 | 1.0103E+06 | −2.8394E+06 | 0.0000E+00 |
| 52 | −8.3141E+01 | −3.7712E+04 | 1.2816E+05 | 0.0000E+00 |

A relationship among important parameters in the wide-angle imaging lens 10 according to the fourth embodiment is shown in Table 12.

TABLE 12

| EFL | 0.41 mm |
|---|---|
| Half Angle of View (HFOV) | 70.0 degrees |
| TTL | 2.298 mm |
| f-number | 4.40 |
| EFL/R1 | −0.41 |
| |EFL/f1| | 1.13 |
| (R3 + R4)/(R3 − R4) | −2.92 |

In the longitudinal spherical aberration diagram of the fourth embodiment shown in FIG. 8A, imaging point deviations of off-axis rays at different heights are controlled to be within a range of ±0.025 mm. In the two field curvature aberration diagrams of FIG. 8B and FIG. 8C, focal length variations of three representative wavelengths in the whole field of view falls within a range of ±0.04 mm. The distortion aberration diagram of FIG. 8D shows that the distortion aberration in the second embodiment is kept within a range of ±45%. Thus, it can be seen that the wide-angle imaging lens 10 according to the fourth embodiment may be endowed with high optical imaging quality under the condition that the TTL has been reduced to approximately 2.650 mm.

In the embodiment of the present invention, the wide-angle imaging lens 10 can achieve the following effects and:

A first lens element 1 for example, it is used to collect light, and the curvature of the first lens element 1 is designed to be negative for light that is used to receive a large angle.

The refractive index of the second lens element 2 is greater than the refractive index of the other lenses with refractive power (that is, the first lens element 1, the third lens element 3, the fourth lens element 4 and the fifth lens element 5), and the Abbe number of the second lens element 2 is less than the refractive index of the other lens elements with refractive power, which can effectively correct the chromatic aberration.

The third lens element 3 focuses the imaged imaging beam and combines it with the fourth lens element 4 having negative refracting power and the fifth lens element 5 having positive refracting power to effectively correct spherical aberration, chromatic aberration and curvature of field.

In addition, in view of unpredictability of optical system design, the optical imaging lens consistent with at least one of the following conditional expressions under the architecture of the present invention may improve the imaging quality of the system better and thereby improving the shortcomings of the prior art.

In the embodiments above, the wide-angle imaging lens 10 satisfies the following conditions: $-0.8 \leq EFL/R1<0$. Since the first lens element 1 compared to other lens elements with refractive power (i.e., the second lens element 2, the third lens element 3, the fourth lens element 4 and the fifth lens element 5) requires a large aggrieved fold, in this range, the object-side surface 11 of the first lens element 1 can reduce the ratio of the outer edge of the optical effective part of the $E_{f1}$ to the outer edge of the optical invalid part of the $E_i$ relative to its centre thickness, and can effectively reduce the size of the angle θ. Where, the centre thickness of the first lens element 1 refers to the distance from the object-side surface 11 to the image-side surface 12 of the first lens element 1 on the optical axis I. The reference plane RP1 is a plane passing through the outer edge Eft of the optical effective portion of the image-side surface 12, and the reference plane RP2 is an extended surface of the optical ineffective portion $P_n$ close to the image-side surface 12. The angle θ refers to the angle between the reference plane RP1 and the reference plane RP2.

In the above embodiments, the wide-angle imaging lens 10 satisfies the following conditions: $0.8 \leq |EFL/f1| \leq 1.2$, |EFL/f1| is the absolute value of EFL/f1. If |EFL/f1| below the lower limit of 0.8, it will derive from the problem of insufficient light capacity for large angles, and if when |EFL/f1| is above the upper limit of 1.2, the effect of the first lens element 1 on the light flexural force of the whole wide-angle imaging lens 10 becomes larger, which leads to the problem of tolerance sensitivity. If |EFL/f1| is within the aforementioned range, the wide-angle imaging lens 10 can avoid the above problems.

In the above embodiments, the wide-angle imaging lens 10 satisfies the following conditions: $-3.0 \leq (R3+R4)/(R3-R4) \leq 0.8$. In this range, the manufacturing tolerances of the second lens element 2 are less sensitive.

In the above embodiments, the angle of view of the wide-angle imaging lens 10 falls within a range of 130 to 150 degrees, and it has the advantage of a wide-angle of view.

Based on the above, the wide-angle imaging lens of the embodiments of the present invention has the following beneficial effects: by concave and convex shape design and arrangement of the object-side surfaces or image-side surfaces of the lens elements and combination of the refractive power of the lens elements, the advantages of a narrow field angle effect, a relatively small TTL, and high imaging quality of the wide-angle imaging lens may be achieved.

The present invention has been disclosed as above with the embodiments but is not limited thereto. Those of ordinary knowledge in the art may make certain modifications and embellishments without departing from the spirit and scope of the present invention. Therefore, the scope of protection of the present invention should be defined by the appended claims.

What is claimed is:

1. A wide angle imaging lens, sequentially comprising a first lens element, a second lens element, an aperture, a third lens element, a fourth lens element and a fifth lens element from an object side to an image side along an optical axis, wherein each of the first lens element to the fifth lens element comprises an object-side surface facing the object side and allowing imaging rays to pass through and an image-side surface facing the image side and allowing imaging rays to pass through, and the lens elements with refractive power are only the five lens elements;

the first lens element having negative refractive power, and the object-side surface of the first lens element being a concave surface in the vicinity of the optical axis, and the image-side surface of the first lens element being a concave surface;

the second lens element having positive refractive power, and the object-side surface of the second lens element being a convex surface;

the third lens element having positive refractive power, the object-side surface of the third lens element being a convex surface, and the image-side surface of the third lens element being a convex surface;

the fourth lens element having negative refractive power, the object-side surface of the fourth lens element being a concave surface, and the image-side surface of the fourth lens element comprising a concave portion in the vicinity of the optical axis; and the fifth lens element having positive refractive power, and the image-side surface of the fifth lens element being a convex surface;

wherein a field angle of the wide-angle imaging lens ranges from 130 degrees to 150 degrees.

2. The wide-angle imaging lens according to claim 1, wherein the wide-angle imaging lens satisfies: $-0.8 \leq EFL/R1<0$, wherein EFL is the effective focal length of the wide-angle imaging lens, and R1 is the curvature radius of the object-side surface of the first lens element.

3. The wide-angle imaging lens according to claim 1, wherein the wide-angle imaging lens satisfies: $0.8 \leq |EFL/f1| \leq 1.2$, wherein EFL is an effective focal length of the wide-angle imaging lens, f1 is a focal length of the first lens element, and |EFL/f1| is an absolute value of EFL/f1.

4. The wide-angle imaging lens according to claim 1, wherein the wide-angle imaging lens satisfies: $-3.0 \leq (R3+R4)/(R3-R4) \leq 0.9$, wherein R3 is a curvature radius of the object-side surface of the second lens element, and R4 is a curvature radius of the image-side surface of the second lens element.

5. The wide-angle imaging lens according to claim 1, wherein the first lens element, the second lens element, the third lens element, the fourth lens element and the fifth lens element have refractive power, the refractive index of the second lens element is greater than or equal to the refractive index of the other lens elements with refractive power, and the Abbe number of the second lens element is less than or equal to the Abbe number of other lens elements with refractive power.

6. The wide-angle imaging lens according to claim 1, wherein the object-side surface of the first lens element is a concave surface, and comprises a concave portion located in the vicinity of a periphery, the object-side surface of the second lens element is a convex surface, the image-side surface of the fourth lens element comprises a concave portion located in the vicinity of the optical axis and a convex portion located in the vicinity of a periphery, the object-side surface of the fifth lens element comprises a convex portion located in the vicinity of the optical axis and a concave portion located in the vicinity of a periphery.

7. The wide-angle imaging lens according to claim 1, wherein the object-surface of the first lens element comprises a convex portion located in the vicinity of a periphery, the object-side surface of the second lens element is a convex surface, the image-side surface of the fourth lens element comprises a concave portion located in the vicinity of the optical axis and a convex portion located in the vicinity of a periphery, the object-side surface of the fifth lens element comprises a convex portion located in the vicinity of the optical axis and a concave portion located in the vicinity of a periphery.

8. The wide-angle imaging lens according to claim 1, wherein the object-side surface of the first lens element is a concave surface, and comprises a concave portion located in the vicinity of a periphery, the object-side surface of the second lens element is a convex surface, the image-side surface of the fourth lens element is a concave surface, and comprises a concave portion located in the vicinity of a periphery, the object-side surface of the fifth lens element is a convex surface.

9. The wide-angle imaging lens according to claim 1, wherein the object-side surface of the first lens element is a concave surface, and comprises a concave portion located in the vicinity of a periphery, the image-side surface of the second lens element is a concave surface, the image-side surface of the fourth lens element comprises a concave portion located in the vicinity of the optical axis and a convex portion located in the vicinity of a periphery, the object-side surface of the fifth lens element is concave surface.

* * * * *